(12) United States Patent
Choi

(10) Patent No.: US 12,513,049 B2
(45) Date of Patent: Dec. 30, 2025

(54) TRANSCEIVING METHOD AND SYSTEM FOR VEHICLE CONTROLLERS

(71) Applicants: Hyundai Motor Company, Seoul (KR); Kia Corporation, Seoul (KR)

(72) Inventor: Ju Ho Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 446 days.

(21) Appl. No.: 18/100,930

(22) Filed: Jan. 24, 2023

(65) Prior Publication Data
US 2024/0022473 A1     Jan. 18, 2024

(30) Foreign Application Priority Data

Jul. 18, 2022  (KR) .................. 10-2022-0088441

(51) Int. Cl.
*H04L 12/00*     (2006.01)
*H04L 41/0893*  (2022.01)
*H04L 41/28*     (2022.01)

(52) U.S. Cl.
CPC .......... *H04L 41/0893* (2013.01); *H04L 41/28* (2013.01)

(58) Field of Classification Search
CPC ..... H04L 41/0893; H04L 41/28; H04L 12/12; H04L 41/082; H04L 12/40039
(Continued)

(56) References Cited

U.S. PATENT DOCUMENTS 8,463,970 B2 *   6/2013  Frantz ................ G06F 1/3206
                                                            713/323
10,944,501 B2 *  3/2021  Ugurlu .............. H04W 72/0446
(Continued)

FOREIGN PATENT DOCUMENTS

EP     4128951 B1 *   2/2025 ........... H04L 5/0053
KR   102369990 B1     3/2022
(Continued)

OTHER PUBLICATIONS

Di Z et al., CN-116766971-A, Charging Circuit For Vehicle, Has Vehicle Controller That Switches From Sleep State To Wake-Up State According To Voltage Signals Detected By Voltage Detecting Ports, When Vehicle Is Connected With External Power Supply Device, 2022 (Year: 2022).*

(Continued)

*Primary Examiner* — Frantz Coby
(74) *Attorney, Agent, or Firm* — Fox Rothschild LLP

(57) ABSTRACT

Systems and methods for controlling vehicle controllers are provided. According to an exemplary embodiment, a method of transceiving performed in a network is provided. The methods comprises transmitting, by a first controller, a first network management (NM) message, wherein the first NM message comprises a request for a subscription to a specific partial network cluster (PNC) to one or more second controllers, performing, by each of the one or more second controllers, an operation setting for the specific PNC in response to the first NM message, broadcasting, by the first controller, a second NM message, wherein the second NM message comprises a request that an identifier of the specific PNC be set to the network, and, maintaining, by the one or more second controllers, a wake-up state, regardless of a preset sleep condition, upon receiving the second NM message.

14 Claims, 6 Drawing Sheets

(58) Field of Classification Search
CPC ... H04L 12/40071; H04L 2012/40273; H04W 4/40; H04W 4/50
USPC .................................................. 370/420, 311
See application file for complete search history.

(56) References Cited

U.S. PATENT DOCUMENTS

| | | | |
|---|---|---|---|
| 2009/0257368 A1* | 10/2009 | Aad ................ | H04W 52/0235 370/311 |
| 2009/0257369 A1* | 10/2009 | Igarashi ............ | H04W 52/0261 455/574 |
| 2012/0173782 A1* | 7/2012 | Frantz ................ | G06F 9/4418 710/267 |
| 2022/0240182 A1* | 7/2022 | Baldemair ........ | H04W 52/0229 |
| 2022/0240187 A1* | 7/2022 | Guo .................. | H04W 76/30 |
| 2023/0180235 A1* | 6/2023 | Bhatoolaul ....... | H04W 72/1273 370/329 |

FOREIGN PATENT DOCUMENTS

| | | | | |
|---|---|---|---|---|
| KR | 10-2022-0050620 A | | 4/2022 | |
| WO | WO-2019114819 A1 | * | 6/2019 | ............ H04W 72/23 |
| WO | WO-2020089450 A1 | * | 5/2020 | ........ H04W 52/0206 |

OTHER PUBLICATIONS

Huang C et al., CN 116684847 A, Vehicle Control Method Using First Controller, Involves Entering Sleep State If First Controller Receives Sleep Instruction And Detects That Broadcast Wake-Up Instruction Sent By Second Controller In Vehicle To First Controller Is Stopped, 2023 (Year: 2023).*

Lin Z et al., CN 113464703 A, Control Method Of Induction Tap Involves Entering Controller Into Sleep State And Periodically Waking Up Controller After Induction Tap Finishes Water Outlet, And Entering Controller When Controller Wakes Up, 2021 (Year: 2021).*

* cited by examiner

TRANSCEIVING METHOD AND SYSTEM FOR VEHICLE CONTROLLERS

CROSS REFERENCE TO RELATED APPLICATION(S)

This application claims, under 35 U.S.C. § 119(a), priority to Korean Patent Application No. 10-2022-0088441, filed on Jul. 18, 2022, the disclosure of which is incorporated herein by reference in its entirety.

BACKGROUND

Technical Field

Embodiments of the present disclosure relate to a transceiving method and system for vehicle controllers and, more particularly, to a transceiving method and system that allows for a dynamic configuration of a partial network of controllers.

Background

With recent developments in electronic technologies, cars have been provided with multimedia devices in which an audio device, a video device, and a navigational device are integrated to form a single system. Additionally, cars have been provided with various vehicle parts including a body control module (BCM) configured to automatically adjust a memory seat, rearview mirror, and side-view mirror positions, a chassis control unit relating to the control of the steering, suspension, and braking system, and a powertrain control unit (e.g., a transmission control module, engine management system, etc.) and engine control unit that are respectively configured to control the transmission and the engine.

In particular, autonomous driving vehicles configured to drive to a destination by identifying a route thereto while adapting to changes in an outdoor environment and avoiding obstacles by using various sensors without a driver have been manufactured for commercial use in recent years.

As a result, the number of vehicle control devices is gradually increasing, and the software applied to the vehicles is being developed both quantitatively and qualitatively to become increasingly complex.

Therefore, vehicle manufacturers need to add new functions in accordance with changing electronic communication environments and technological developments and fix errors by periodically updating the software applied to control devices over the lifecycle of the sold vehicles.

A partial network (PN) function may be used to update or operate some of these controllers. In order to utilize PN functions, conventional art performs communication by selectively waking up specific controllers through a one-to-one static match between a communication control unit (CCU) and specific controllers.

However, the disadvantages of this method are that prior configurations are required for the controllers and that the vehicles must be recalled when a specific use-case is found in mass-produced vehicles.

In addition, since this method usually identifies a network configuration by fixed data size, the application of 4-byte partial network information (PNI) allows the handling of 32 use-cases only, for example. A problem is that various combinations of use-cases may not be managed.

Therefore, there is a need for a technology that allows dynamic configurations of a partial network of controllers to manage various combinations of use-cases in the art.

SUMMARY

A technical object of the present disclosure is to provide a method of dynamically configuring a partial network that may address various use-cases without changing a partial network (PN) specification.

The technical objects to be achieved by the present are not limited to the technical objects described above, and other technical objects not described above may be clearly understood by those skilled in the art to which the present disclosure pertains from the following description.

According to an exemplary embodiment of the present disclosure, a method of transceiving performed in a vehicle network is provided. The method may comprise transmitting, by a first controller, a first network management (NM) message. The first NM message may comprise a request for a subscription to a specific partial network cluster (PNC) to one or more second controllers. The method may comprise performing, by each of the one or more second controllers, an operation setting for the specific PNC in response to the first NM message, broadcasting, by the first controller, a second NM message. The second NM message may comprise a request that an identifier of the specific PNC be set to a vehicle network. The method may comprise maintaining, by the one or more second controllers, a wake-up state, regardless of a preset sleep condition upon receiving the second NM message.

According to an exemplary embodiment, the transceiving method may further comprise transmitting, by the first controller, a third NM message, wherein the third NM message may comprise a request for a cancellation of the subscription to the specific PNC to each of the one or more second controllers.

According to an exemplary embodiment, the first and third NM messages may comprise a network request reason field. According to an exemplary embodiment, the network request reason field may comprise an NM identifier (NM ID) for each of the one or more second controllers.

According to an exemplary embodiment, the second NM message may comprise a network request reason field. According to an exemplary embodiment, the network request reason field may comprise a value of "0".

According to an exemplary embodiment, the first NM message, the second NM message, and the third NM message may comprise a control bit vector field. According to an exemplary embodiment, the control bit vector field may comprise an indicator for a PNC subscription request and an indicator for a PNC subscription cancellation request.

According to an exemplary embodiment, the first NM message, the second NM message, and the third NM message may comprise a partial network information (PNI) field. According to an exemplary embodiment, the PNI field may comprise information on the operation of the one or more second controllers.

According to an exemplary embodiment, the network may comprise a vehicle network.

According to an object of the present disclosure, a vehicle network system is provided. The system may comprise a first controller configured to transmit a first NM message. The first NM message may comprise a request for a subscription to a specific PNC to one or more second controllers. The first controller may further be configured to broadcast a second NM message. The second NM message may comprise a request that an identifier of the specific PNC be set to the vehicle network. The system may further comprise the one or more second controllers. The one or more second controllers may be configured to maintain a wake-up state, regardless of a predetermined sleep condition, upon receiving the second NM message from the first controller.

According to an exemplary embodiment, the first controller may be configured to transmit a third NM message. According to an exemplary embodiment, the third NM message may comprise a request for a cancellation of the subscription to the specific PNC to each of the one or more second controllers.

According to an exemplary embodiment, the first NM message and the third NM message may comprise a network request reason field. According to an exemplary embodiment, the network request reason field may comprise a network management identifier (NM ID) for each of the one or more second controllers.

According to an exemplary embodiment, the second NM message may comprise a network request reason field. According to an exemplary embodiment, the network request reason field may comprise a value of "0".

According to an exemplary embodiment, the first NM message, the second NM message, and the third NM message may comprise a control bit vector field. According to an exemplary embodiment, the control bit vector field may comprise an indicator for a request for the subscription to the PNC and an indicator for a request for a cancellation of the specific PNC.

According to an exemplary embodiment, the first NM message, the second NM message, and the third NM message may comprise a PNI field. According to an exemplary embodiment, the PNI field may comprise information on the operation of the one or more second controllers.

According to an exemplary embodiment, the network may comprise a vehicle network.

According to the various exemplary embodiments described above, various PN use-cases may be managed without changing the partial network (PN) specification.

In addition, various PN use-cases that are likely to be explored in the future may be easily managed.

The effects obtainable by the present disclosure are not limited to the effects described above and other effects not described above may be clearly understood by those skilled in the art to which the present disclosure pertains from the following description.

BRIEF DESCRIPTION OF THE DRAWINGS

The accompanying drawings, which are incorporated in and form a part of the Detailed Description, illustrate various embodiments of the subject matter and, together with the Detailed Description, serve to explain principles of the subject matter discussed below. Unless specifically noted, the drawings referred to in this Brief Description of the Drawings should be understood as not being drawn to scale. Herein, like items are labeled with like item numbers.

DETAILED DESCRIPTION

Figure 1:
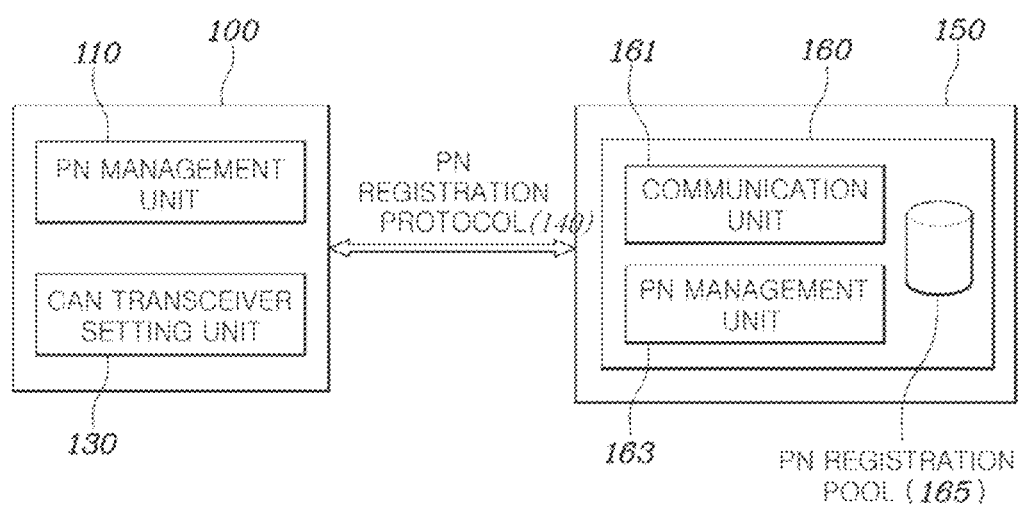
FIG. 1 schematically illustrates a structure of a PN control system according to an exemplary embodiment of the present disclosure.

Embodiments of the present specification will be described with reference to the accompanying drawings in the following. The same or similar components will be given the same reference numerals regardless of the drawing numbers, and repetitive descriptions of these components will be omitted. The suffixes "module" and "unit" for the components used in the following description are given or interchangeably used only in consideration of the ease of writing the specification and do not have meanings or roles distinct from each other by themselves. When it is determined that the specific description of the related and already known technology may obscure the gist of the embodiments disclosed in the specification, the specific description will be omitted. Further, it is to be understood that the accompanying drawings are for a better understanding of the embodiment disclosed in the present specification and that the technical ideas disclosed in the present specification are not limited by the accompanying drawings and include all the modifications, equivalents, or substitutes included in the spirit and technical scope of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may exist in between. In contrast, when a component is referred to as being "directly connected" or "directly coupled" to another component, it is to be understood that there are no intervening components present.

Singular expressions include plural expressions unless the context explicitly indicates otherwise.

In the present specification, terms such as "comprise" or "have" are intended to designate the presence of implemented features, numbers, steps, operations, components, parts, or combinations thereof and are not to be understood to preclude the presence or additional possibilities of one or more of other features, numbers, steps, operations, components, parts, or combinations thereof in advance.

FIG. 1 schematically illustrates a structure of a PN control system according to an exemplary embodiment of the present disclosure.

FIG. 1 shows that a partial network (PN) control system may comprise a PN controller 100 and a communication control unit (CCU) 150 according to the embodiment.

In the present disclosure, the partial network means that only the ECU clusters that receive the CAN message rather than all the ECUs wake up. A partial network cluster (PNC) is mapped to a specific function or operation of a vehicle. For example, a PNC may be mapped to an OTA update of some controllers.

When a CCU 150 needs to simultaneously update or control a plurality of controllers in a bundle, the PN controller 100 may be configured to generate a request message about a PNC configuration that may manage the controllers in a bundle and may be configured to transmit the request message to the CCU 150. According to an exemplary embodiment, the information about the PNC configuration may be transmitted via a PN registration protocol 140.

The PN controller 100 may comprise a PN management unit 110 and a CAN transceiver setting unit 130.

The PN management unit 110 may be configured to generate a message requesting the generation of a partial network (PN} to manage a plurality of controllers in a bundle and may be configured to transmit the message to the CCU 150 or may be configured to receive the PN generation information from the CCU 150.

The CAN transceiver setting unit 130 may be configured to set the CAN communication of the controllers in a PNC.

The CCU 150 may be configured to generate a message requesting the generation or cancellation of a partial network and may be configured to transmit the message to other controllers, or may be configured to receive a message requesting the generation or cancellation of a partial network from the PN controller 100 and may be configured to transmit the received request message to other controllers.

The CCU 150 may comprise a PN registration server 160, and the PN registration server 160 may comprise a communication unit 161, a PN management unit 163, and a PN registration pool 165.

The PN registration server 160 may be configured to manage the PN subscription of a plurality of controllers.

The communication unit 161 may be configured to perform communication with the PN controller 100 and other controllers.

According to an exemplary embodiment, the communication unit 161 may be configured to transmit a network management (NM) message to the controllers or receive an NM message from the controllers.

In addition, the communication unit 161 may be configured to receive information about a generated partial network (PN) generated from the PN controller 100.

The PN management unit 163 may be configured to generate a PN in which a plurality of controllers may be managed in a bundle and may be configured to generate an NM message based thereon for transmission to the controllers.

The PN registration pool 165 may be configured to store a PN in which a plurality of controllers is managed in a bundle.

According to an exemplary embodiment, the CCU 150 may be configured to transmit an NM message to control the operations of the controllers at the time of an over-the-air (OTA) update.

According to an exemplary embodiment, the CCU 150 may be configured to use a NM message to control the operations of a plurality of controllers. In particular, a 4-byte partial network information (PNI) field may be used as a means for indicating each controller for control.

TABLE 1 below shows an example of the structure of the PNI field.

TABLE 1

|     | bit 7 | bit 6 | bit 5 | bit 4 | bit 3 | bit 2 | bit 1 | bit 0 |
| --- | --- | --- | --- | --- | --- | --- | --- | --- |
| PNI | PNC_8 (CCU, MDPS) | PNC_7 (CCU, ESC) | PNC_6 (CCU, ACU) | PNC_5 (CCU, TCU) | PNC_4 (CCU, EMS) | PNC_3 (CCU, VCU) | PNC_2 (Cooperation between OTA and ECU) | PNC_1 (All ECUs) |
|     | PNC_16 (CCU, ADAS_VP) | PNC_15 (CCU, e-LSD) | PNC_14 (CCU, AWD) | PNC_13 (CCU, RGW, MDPS2) | PNC_12 (CCU, BMS) | PNC_11 (CCU, RWS) | PNC_10 (CCU, SBW) | PNC_9 (CCU, ECS, AirSUS) |
|     | PNC_24 (ccNC, ccIC, CLU) | PNC_23 (CCU, FR_CMR) | PNC_22 (CCU, RCU) | PNC_21 (CCU, BLTN_CAM) | PNC_20 (CCU, ccIC) | PNC_19 (CCU, HIM) | PNC_18 (CCU, ADAS_PRK2/ ADAS_PRK) | PNC_17 (CCU, ADASDRV2/ ADAS_DRV) |
|     | PNC_32 (CCU) | PNC_31 (CCU) | PNC_30 (CCU) | PNC_29 (CCU) | PNC_28 (CCU) | PNC_27 (ICC, ETCS) | PNC_26 (AMP, VESS, ADP) | PNC_25 (MKBD, RRC, CCP) |

TABLE 1 shows that a static type of logical partial cluster is bundled to indicate a plurality of controllers for controlling operations in the conventional PNI field and that the CCU 150 and the controllers are matched one-to-one to be clustered.

However, as the number of physical controllers that need OTA updates is gradually increasing, the one-to-one static match between the CCU and specific controllers using the PNI message as described above limits the support for the OTA update of all controllers.

Therefore, a control method and system according to the present disclosure that may more dynamically indicate a plurality of controllers to be controlled by the CCU will be described in the following.

According to an exemplary embodiment, the NM message transmitted from the CCU 150 to the controllers may comprise the fields as shown in TABLE 2 below.

TABLE 2

| Byte | Field |
| --- | --- |
| Byte 0 | Source Node Identifier |
| Byte 1 | Control Bit Vector |
| Byte 2 | Network Request Reason |
| Byte 3 | NM State |
| Byte 4 | PNI |

According to an exemplary embodiment, the control bit vector (CBV) field in the NM message may comprise the bits in TABLE 3 below.

TABLE 3

| Bit 0 | Bit 1 | Bit 2 | Bit 3 | Bit 4 | Bit 5 | Bit 6 | Bit 7 |
| --- | --- | --- | --- | --- | --- | --- | --- |
| CBV | Reserved | PN info bit | Reserved | Active Wakeup Bit | NM Coordinator Sleep Ready Bit | NM Coordinator ID | Repeat Message Request |

According to an exemplary embodiment, the CCU 150 may modify the CBV field in TABLE 3 into the CBV field as shown in TABLE 4 and transmit the modified CBV field to request a subscription to or cancellation of a PNC to the controllers.

TABLE 4

| Bit 0 | Bit 1 | Bit 2 | Bit 3 | Bit 4 | Bit 5 | Bit 6 | Bit 7 |
| --- | --- | --- | --- | --- | --- | --- | --- |
| CBV | PNC Cancellation Request | PN info bit | PNC Subscription Request | Active Wakeup Bit | NM Coordinator Sleep Ready Bit | NM Coordinator ID | Repeat Message Request |

TABLE 4 shows that the first bit of the CBV field may comprise information about whether a PNC cancellation is requested.

According to an exemplary embodiment, the information (1st bit) about whether a PNC cancellation is requested may be set to a value of "1" when the PNC cancellation is requested and may be set to a value of "0" when the PNC cancellation is not requested.

In addition, the third bit of the CBV field may comprise information about whether a PNC subscription is requested.

According to an exemplary embodiment, the information (3rd bit) about whether a PNC subscription is requested may be set to a value of "1" when a PNC subscription is requested and may be set to a value of "0" when a PNC subscription is not requested.

According to an exemplary embodiment, the network request reason field may be modified to indicate the reason for the PNC subscription request and the reason for the PNC cancellation request.

According to an exemplary embodiment, the PNI field in TABLE 1 may modify all or some of the data bits constituting the field so that the bits may comprise information about the operation of the PNC. For example, the PNI field may be modified so that PNC_1 to PNC_4 indicate the following information:
1) PNC_1: over-the-air (OTA) update
2) PNC_2: operation after ignition (IGN) off
3) PNC_3: operation during parking
4) PNC_4: operation when combined charging system (CCS) service is requested.

For example, an NM message comprising a PNI field in which PNC_1="1" and other data bits (PNC_2 . . . PNC_32) are set to "0" may indicate the controllers requested to subscribe to the PNC to perform the OTA updates. In addition, an NM message comprising a PNI field in which PNC_2="1" and other data bits (PNC_1, PNC_3 . . . PNC_32) are set to "0" may indicate the controllers requested to subscribe to a PNC to keep operating without entering an idle mode or a sleep mode even after IGN OFF.

Embodiments of transceiving the OTA update messages or control messages to and from the controllers by using the modified NM message as described above will be described below.

Embodiment 1) Transmission of NM Message for OTA Update

The CCU may be configured to perform an OTA update for some controllers. According to an exemplary embodiment, the CCU may only configure the PNC with the controllers that will be subjected to the OTA update.

Figure 2:
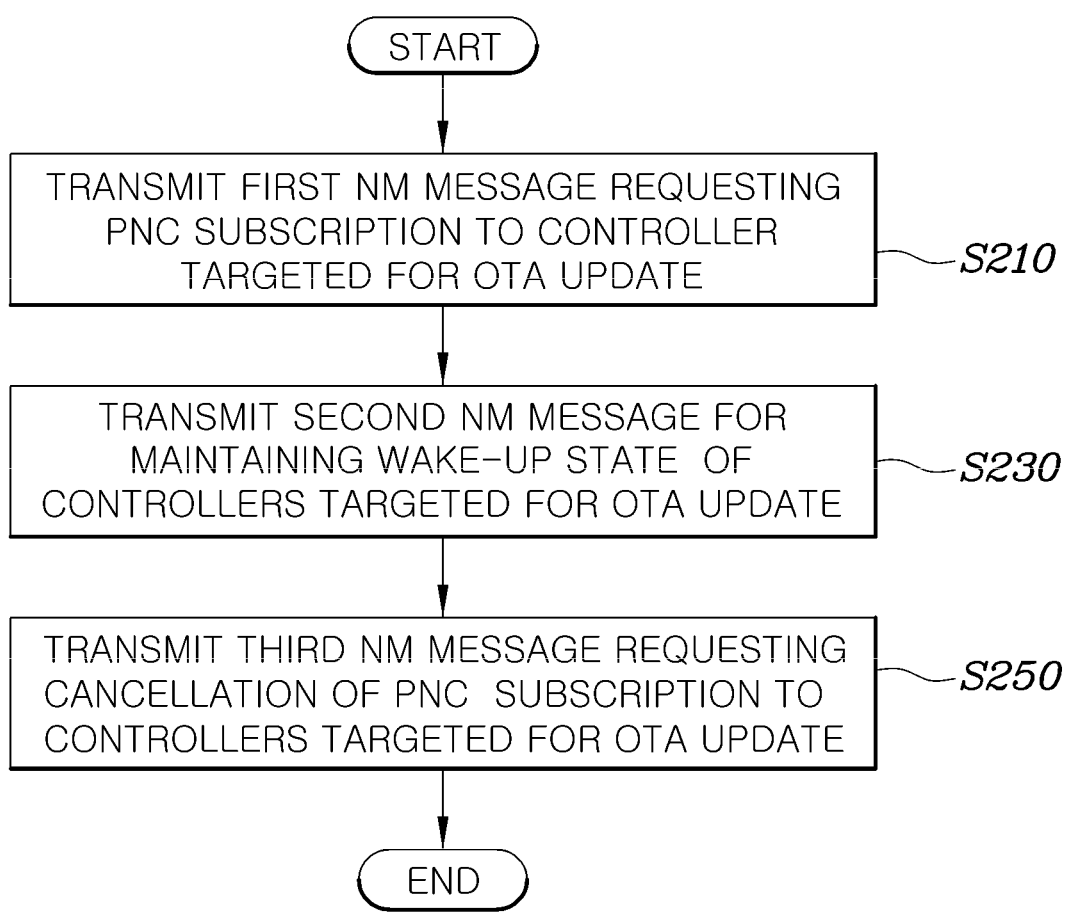
FIG. 2 illustrates an operating method of a communication control unit according to an exemplary embodiment of the present disclosure.

FIG. 2 illustrates an operating method of a CCU according to an exemplary embodiment of the present disclosure.

FIG. 2 shows that the CCU may be configured to transmit a first NM message requesting a PNC subscription to the controllers targeted for an OTA update (S210).

According to an exemplary embodiment, the NM message requesting a PNC subscription may comprise the fields of TABLE 2.

According to an exemplary embodiment, the CBV field may comprise the bit information of TABLE 4.

According to an exemplary embodiment, the information (1st bit), included in the CBV field, about whether a PNC cancellation is requested may be set to a value of "0" and the information (3rd bit) about whether a PNC subscription is requested may be set to a value of "1" when a PNC subscription is requested.

According to an exemplary embodiment, the network request reason field in the NM message may comprise information about an NM ID of the controller targeted for a request to subscribe to a PNC. That is, the network request reason field may comprise the NM ID information of the controller that receives the NM message requesting a PNC subscription.

According to an exemplary embodiment, the network request reason field may have a size of 1 byte and may only comprise identifier information of one controller at the same time.

Therefore, the CCU may configure and transmit an NM message for one controller at a time and may reconfigure the NM ID in the network request reason field of the controller and transmit the NM message when requesting a plurality of controllers to subscribe to the PNC.

For example, when the CCU configures a PNC for n controllers and may be configured to perform an OTA update, the CCU may configure NM messages different from each other for the n controllers and transmit messages requesting a PNC subscription n times.

In addition, among the bits constituting the PNI field in the NM message, the bits indicating OTA (or OTA update) may be set to a value of "1" while other bits may be set to a value of "0".

Figure 3:
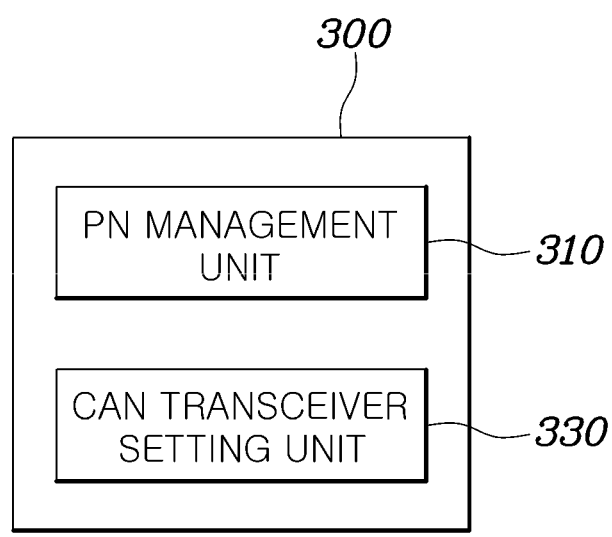
FIG. 3 illustrates a structure of a controller according to an exemplary embodiment of the present disclosure.

According to an exemplary embodiment, FIG. 3 shows that the controller 300 receiving the NM message of the CCU may comprise a PN management unit 310 and a CAN transceiver setting unit 330. According to an exemplary embodiment, the PN management unit 310 may check and perform the PNC operation included in the NM message received from the CCU. For example, the PN management unit 310 may be configured to perform the OTA update.

According to an exemplary embodiment, the CAN transceiver setting unit 330 may be configured to set the transmission and reception for CAN communication of the controller 300.

FIG. 2 further shows that the CCU may be configured to transmit to the network a second NM message for maintaining the wake-up state of the controllers targeted for an OTA update (S230).

According to an exemplary embodiment, the second NM message may be transmitted in a manner of broadcasting to an unspecified number of controllers in the vehicle network to which the CCU belongs.

According to an exemplary embodiment, the second NM message may comprise the fields of TABLE 2.

According to an exemplary embodiment, the CBV field of the NM message may comprise the bit information of TABLE 4.

According to an exemplary embodiment, both the information (1st bit), included in the CBV field, about whether the PNC cancellation is requested and the information (the 3rd bit) about whether a PNC subscription is requested may be set to a value of "0".

According to an exemplary embodiment, the network request reason field in the NM message may be set to a value of "0".

In addition, among the bits constituting the PNI field in the NM message, the bits indicating OTA (or OTA update) may be set to a value of "1" while other bits may be set to a value of "0".

According to an exemplary embodiment, the CCU configures and may be configured to transmit different NM IDs in the network request reason field according to the controller when transmitting the first NM message such that the CCU configures and may be configured to transmit an NM message for one controller at a time. However, the same NM message may be transmitted at a time for the second NM message.

In addition, the CCU may be configured to transmit a third NM message requesting a cancellation of the PNC subscription to the controllers targeted for an OTA update (S250).

According to an exemplary embodiment, the NM message requesting the cancellation of the PNC subscription may comprise the fields of TABLE 2.

According to an exemplary embodiment, the CBV field may comprise the bit information of TABLE 4.

According to an exemplary embodiment, the information (1st bit), included in the CBV field, about whether a PNC cancellation is requested may be set to a value of "1" and the information (3rd bit) about whether a PNC subscription is requested may be set to a value of "0" when the PNC subscription is requested.

According to an exemplary embodiment, the network request reason field in the NM message may comprise information about the NM ID of the controllers targeted for a request to unsubscribe from the PNC. That is, the network request reason field may comprise NM ID information of the controllers receiving the NM message requesting the PNC subscription cancellation.

According to an exemplary embodiment, the CCU may be configured to transmit the NM message requesting one controller to unsubscribe from the PNC at a time as in the step S210.

In addition, among the bits constituting the PNI field in the NM message, the bits indicating OTA (or OTA update) may be set to a value of "1" and other bits may be set to a value of "0".

According to an exemplary embodiment, after transmitting the NM message to the controllers in steps S210 to S250, the CCU does not receive from the controllers a response signal about whether the NM message is normally received. Therefore, the CCU may repeatedly transmit the same message to the controllers several times to ensure safe transmission of the NM. For example, the CCU may be configured to transmit the same message three times to each of the controllers in each step.

Figure 4:
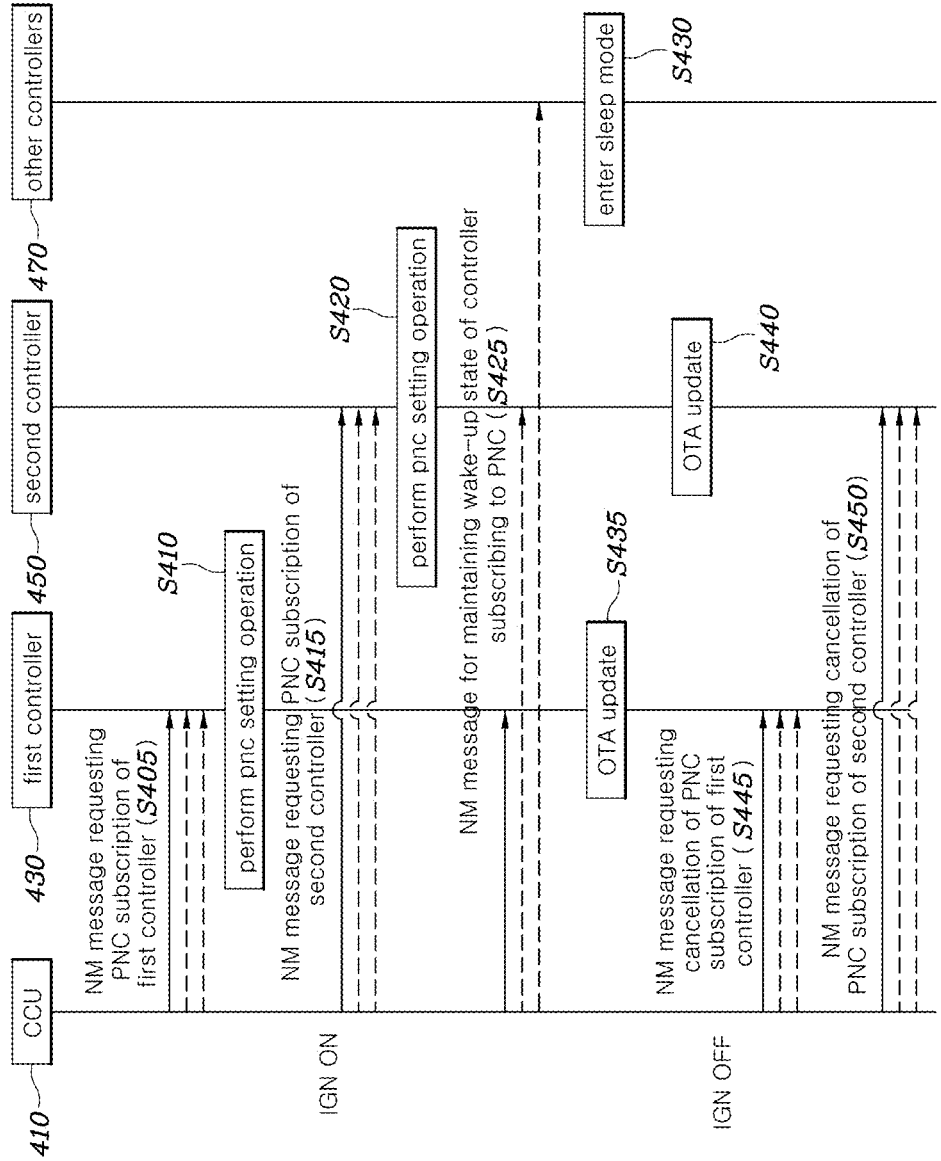
FIG. 4 illustrates a method of transceiving messages between a communication control unit and controllers in a communication system according to an exemplary embodiment of the present disclosure.

FIG. 4 illustrates a method of transceiving messages between the CCU and controllers in a communication system according to an exemplary embodiment of the present disclosure.

FIG. 4 shows that the communication system may comprise the CCU 410, a first controller 430, a second controller 450, and other controllers 470.

The first and second controllers (430, 450) may be controllers targeted for an OTA update and other controllers may not need the OTA update. For example, the first controller may be an electronic stability control (ESC), and the second controller may be a steer by wire (SBW).

FIG. 4 shows that the CCU 410 may be configured to transmit to the first controller 430 an NM message requesting a PNC subscription of the first controller 430 (S405) and may be configured to transmit to the second controller 450 an NM message requesting a PNC subscription of the second controller 450 (S415).

The NM message requesting a PNC subscription may comprise the fields of TABLE 2 in the steps S405 and S420.

According to an exemplary embodiment, the CBV fields may comprise the bit information of TABLE 4.

According to an exemplary embodiment, the information (1st bit), included in the CBV field, about whether a PNC cancellation is requested may be set to a value of "0", and the information (3rd bit) about whether a PNC subscription is requested may be set to a value of "1" when a PNC subscription is requested.

According to an exemplary embodiment, the network request reason field in the NM message may have a size of 1 byte and may comprise information about the NM ID of the controller targeted for a request to subscribe to a PNC. That is, the network request reason field may comprise the NM ID for the first controller in the step S405, and the network request reason field may comprise the NM ID for the second controller in the step S420.

In addition, among the bits constituting the PNI field in the NM message, the bits indicating the OTA (or OTA update) may be set to a value of "1" and other bits may be set to a value of "0".

According to an exemplary embodiment, the first and second controllers 430, 450 respectively perform a PNC setting operation upon receiving from the CCU 410 the NM message requesting the PNC subscription (S410, S420).

In addition, the CCU 410 may be configured to transmit to the network an NM message for maintaining the wake-up state of the controller subscribing to the PNC (S430).

According to an exemplary embodiment, the NM message transmitted to the network may be transmitted in a manner of broadcasting to an unspecified number of controllers in the vehicle network to which the CCU belongs.

According to an exemplary embodiment, the NM message transmitted to the network may comprise the fields of TABLE 2.

According to an exemplary embodiment, the CBV field of the NM message may comprise the bit information of TABLE 4.

According to an exemplary embodiment, both the information (1st bit), included in the CBV field, about whether a PNC cancellation is requested and the information (3rd bit) about whether a PNC subscription is requested may be set to a value of "0".

According to an exemplary embodiment, the network request reason field in the NM message may be set to a value of "0".

In addition, among the bits constituting the PNI field in the NM message, the bits indicating the OTA (or OTA update) may be set to a value of "1" and other bits may be set to a value of "0".

According to an exemplary embodiment, when the vehicle enters the IGN OFF mode from the IGN on mode, the controllers 470 other than the first and second controllers 430, 450 enter the sleep mode (S430). In contrast, the first and second controllers 430, 450 maintain the wake-up state even when the vehicle enters IGN OFF mode.

According to an exemplary embodiment, the first controller 430 may be configured to perform an OTA update according to the PNC setting operation of the step S410 (S435), and the second controller 450 may be configured to perform an OTA update according to the PNC setting operation of the step S420 (S440).

According to an exemplary embodiment, the first and second controllers 430, 450 may be configured to perform the OTA update while maintaining the wake-up state regardless of whether the vehicle is in the IGN ON mode and enters the IGN OFF mode by the PNC setting operation.

Next, the CCU 410 may be configured to transmit to the first controller 430 an NM message requesting a cancellation of the PNC subscription of the first controller 430 (S445) and may be configured to transmit to the second controller 450 an NM message requesting a cancellation of the PNC subscription of the second controller 450 (S450).

The NM message requesting a cancellation of the PNC subscription may comprise the fields of TABLE 2 in the steps S445 and S450.

According to an exemplary embodiment, the CBV field may comprise the bit information of TABLE 4.

According to an exemplary embodiment, the information (1st bit), included in the CBV field, about whether a PNC cancellation is requested may be set to a value of "1", and the information (3rd bit) about whether a PNC subscription is requested may be set to a value of "0" when a PNC subscription is requested.

According to an exemplary embodiment, the network request reason field in the NM message may have a size of 1 byte and may comprise information about the NM ID of the controller targeted for a request to unsubscribe from the PNC. That is, the network request reason field may comprise the NM ID for the first controller in the step S445 and may comprise the NM ID for the second controller in the step S450.

In addition, among the bits constituting the PNI field in the NM message, the bits indicating the OTA (or OTA update) may be set to a value of "1", and other bits may be set to a value of "0".

According to an exemplary embodiment, after transmitting the NM message to the controllers 430, 450, 470 in steps S410 to S450, the CCU 410 does not receive from the controllers 430, 450, 470 a response signal about whether the NM message is normally received. Therefore, the CCU may repeatedly transmit the same message to the controllers 430, 450, 470 several times to ensure safe transmission of the NM message. For example, the CCU may be configured to transmit the same message three times to each of the controllers in each step.

Embodiment 2) Transmission of an NM Message to Operate Only Some Air Conditioning Controllers after the Ignition is Off According to an exemplary embodiment, some controllers may be configured to transmit a message requesting a PNC subscription to other controllers in the partial network system. For example, while some air conditioning controllers subscribe to a PNC defined for the operation even after the ignition is off, this request for the PNC subscription may also be transmitted to other air conditioning controllers. According to an exemplary embodiment, the controllers do not directly perform communication, but the CCU may serve as a router receiving a message from a message transmitting controller and simply relaying the message to a message receiving controller. According to the present embodiment, the controller transmitting the message requesting a PNC subscription is defined as a first controller, and the controller receiving the message requesting a PNC subscription is defined as a second controller.

Figure 5:
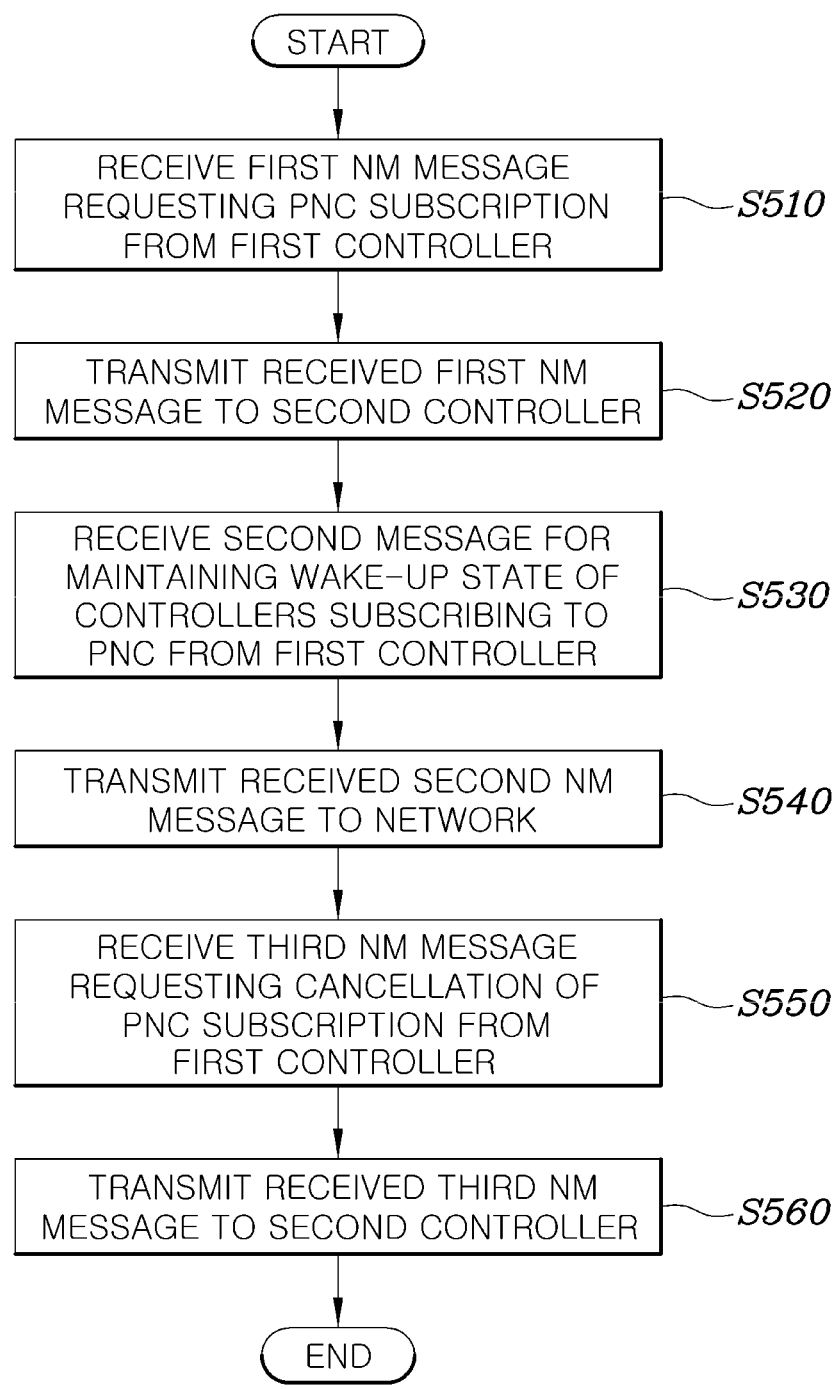
FIG. 5 illustrates an operating method of a communication control unit according to another embodiment of the present disclosure.

FIG. 5 illustrates an operating method of the CCU according to an exemplary embodiment of the present disclosure.

FIG. 5 shows that the CCU may be configured to receive an NM message requesting a PNC subscription from the first controller (S510) and may be configured to transmit the received NM message to the second controller (S520).

According to an exemplary embodiment, the first and second controllers may be in different channels.

In addition, the second controller may comprise a plurality of controllers.

According to an exemplary embodiment, the NM message requesting the PNC subscription may comprise the fields of TABLE 2.

According to an exemplary embodiment, the CBV field may comprise the bit information of TABLE 4.

According to an exemplary embodiment, the information (1st bit), included in the CBV field, about whether a PNC cancellation is requested may be set to a value of "0", and the information (3rd bit) about whether a PNC subscription is requested may be set to a value of "1" when a PNC subscription is requested.

According to an exemplary embodiment, the network request reason field in the NM message may comprise information about the NM ID of a controller targeted for a request to subscribe to a PNC. That is, the network request reason field may comprise NM ID information about the second controller.

According to an exemplary embodiment, the network request reason field may have a size of 1 byte and may comprise the identifier information for one controller at the same time.

In addition, among the bits constituting the PNI field in the NM message, the bits indicating the operation in the IGN OFF state may be set to a value of "1", and other bits may be set to a value of "0".

In addition, the CCU may be configured to receive from the first controller a second NM message for maintaining the wake-up state of the controller subscribing to the PNC (S530) and may be configured to transmit the received second NM message to the network (S540).

According to an exemplary embodiment, the second NM message may comprise the fields of TABLE 2.

According to an exemplary embodiment, the CBV field of the second NM message may comprise the bit information of TABLE 4.

According to an exemplary embodiment, both the information (1st bit), included in the CBV field, about whether a PNC cancellation is requested and the information (3rd bit) about whether a PNC subscription is requested may be set to a value of "0".

According to an exemplary embodiment, the network request reason field in the second NM message may be set to a value of "0".

In addition, among the bits constituting the PNI field in the second NM message, the bits indicating the operation in the IGN OFF state may be set to a value of "1", and other bits may be set to a value of "0".

In addition, the CCU may be configured to receive a third NM message requesting a cancellation of the PNC subscription from the first controller (S550) and may be configured to transmit the received third NM message to the second controller (S560).

According to an exemplary embodiment, the NM message requesting the cancellation of the PNC subscription may comprise the fields of TABLE 2.

According to an exemplary embodiment, the CBV field may comprise the bit information of TABLE 4.

According to an exemplary embodiment, the information (1st bit), included in the CBV field, about whether a PNC cancellation is requested may be set to a value of "1", and the information (3rd bit) about whether a PNC subscription is requested may be set to a value of "0" when a PNC subscription is requested.

According to an exemplary embodiment, the network request reason field in the NM message may comprise information about the NM ID of a controller target for a request to unsubscribe from the PNC. That is, the network request reason field may comprise the NM ID information about the second controller. In addition, among the bits constituting the PNI field in the NM message, the bits indicating the operation in the IGN OFF state may be set to a value of "1", and other bits may be set to a value of "0".

According to an exemplary embodiment, after transmitting the NM message to the controllers in steps S510 to S560, the first controller and the CCU do not receive a response signal about whether the NM message is normally received. Therefore, the first controller and the CCU may repeatedly transmit the same message several times to ensure safe transmission of the NM message. For example, the first controller and the CCU may be configured to transmit the same message to the CCU or the second controller three times in each step.

Figure 6:
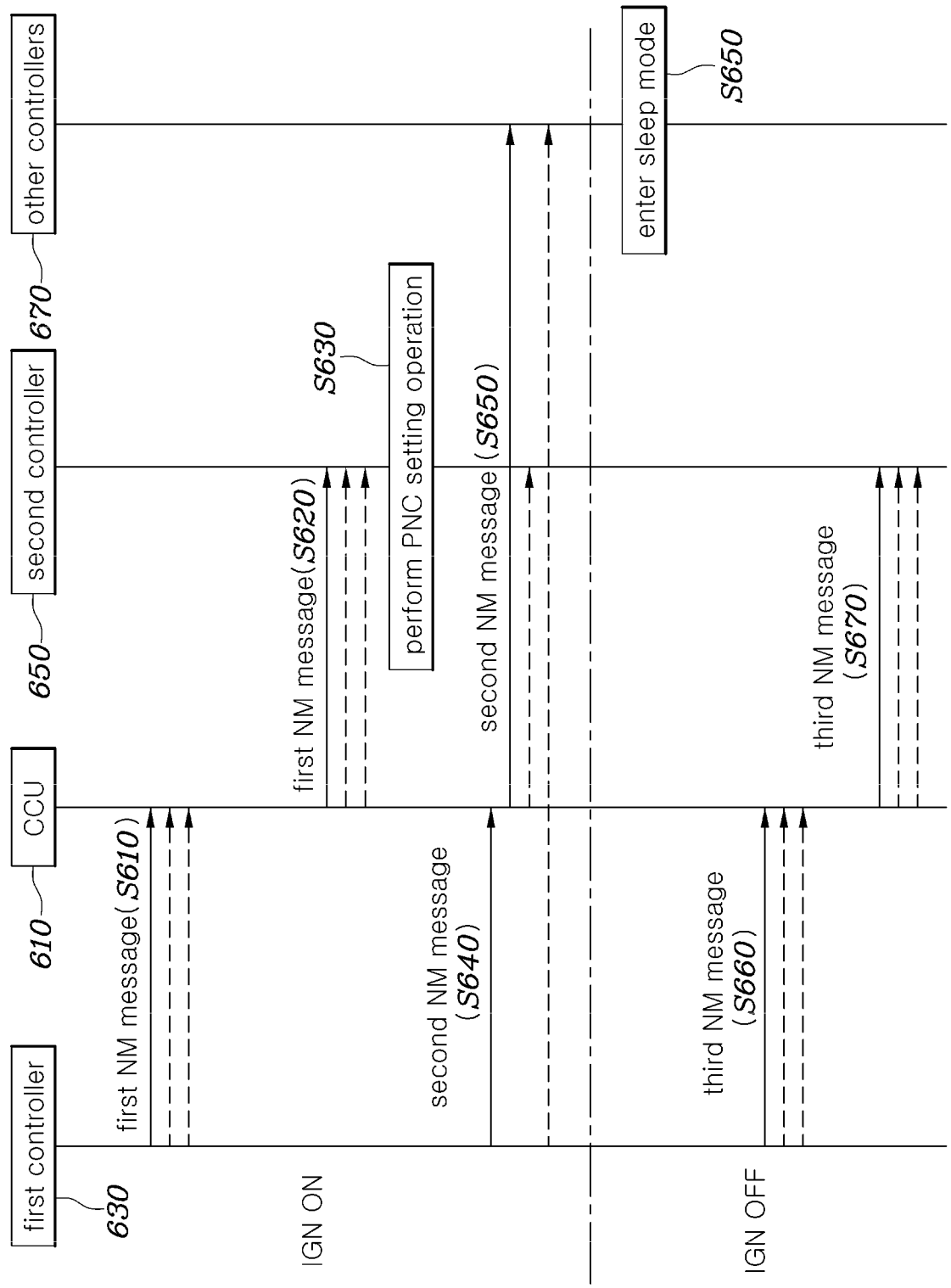
FIG. 6 illustrates a method of transceiving messages between a communication control unit and controllers in a communication system according to another embodiment of the present disclosure.

FIG. 6 illustrates a method of transceiving messages between the CCU and controllers according to an exemplary embodiment of the present disclosure.

FIG. 6 shows that the CCU 610 may be configured to receive a first NM message requesting a PNC subscription from a first controller 630 (S610) and may be configured to transmit the received NM message to a second controller 650 (S620).

According to an exemplary embodiment, the first NM message may comprise the fields of TABLE 2.

According to an exemplary embodiment, the CBV field may comprise the bit information of TABLE 4.

According to an exemplary embodiment, the information (1st bit), included in the CBV field, about whether a PNC cancellation is requested may be set to a value of "0", and the information (3rd bit) about whether a PNC subscription is requested may be set to a value of "1" when a PNC subscription is requested.

According to an exemplary embodiment, the network request reason field in the first NM message may comprise information about the NM ID of a controller targeted for a request to subscribe to a PNC. That is, the network request reason field may comprise the NM ID information for the second controller.

According to an exemplary embodiment, the network request reason field may have a size of 1 byte and may comprise only identifier information for one controller at the same time.

In addition, among the bits constituting the PNI field in the first NM message, the bits indicating the operation in the IGN OFF state may be set to a value of "1", and other bits may be set to a value of "0".

Next, the second controller 650 may be configured to perform a PNC setting operation (S630).

That is, the second controller 650 may be configured to perform an internal setting for the air conditioning operation after IGN OFF.

Next, the CCU 610 may be configured to receive from the first controller 630 a second NM message for maintaining the wake-up state of the controllers subscribing to the PNC (S640) and may be configured to transmit the received second NM message to the network (S650).

According to an exemplary embodiment, the second NM message may be transmitted in a manner of broadcasting to an unspecified number of controllers in the vehicle network to which the CCU belongs.

According to an exemplary embodiment, the first controller 630 may be configured to transmit the second NM message in a manner of broadcasting to an unspecified number of controllers in the vehicle network to which a first unit belongs instead of going through the CCU.

According to an exemplary embodiment, the second NM message may comprise the fields of TABLE 2.

According to an exemplary embodiment, the CBV field of the second NM message may comprise the bit information of TABLE 4.

According to an exemplary embodiment, both the information (1st bit), included in the CBV field, about whether a PNC cancellation is requested and the information (3rd bit) about whether a PNC subscription is requested may be set to a value of "0".

According to an exemplary embodiment, the network request reason field in the second NM message may be set to a value of "0".

In addition, among the bits constituting the PNI field in the NM message, the bits indicating the operation in the IGN OFF state may be set to a value of "1", and other bits may be set to a value of "0".

According to an exemplary embodiment, when the vehicle enters the IGN OFF mode from the IGN ON mode, the first controller 630 and other controllers 670 that do not receive the first NM information from the first controller enter the sleep mode (S660).

In addition, the CCU may be configured to receive from the first controller a third NM message requesting a cancellation of the PNC subscription of the second controller (S670) and may be configured to transmit the received third NM message to the second controller (S680).

According to an exemplary embodiment, the third NM message may comprise the fields of TABLE 2.

According to an exemplary embodiment, the CBV field may comprise the bit information of TABLE 4.

According to an exemplary embodiment, the information (1st bit), included in the CBV field, about whether a PNC cancellation is requested may be set to a value of "1", and the information (3rd bit) about whether a PNC subscription is requested may be set to a value of "0" when a PNC subscription is requested.

According to an exemplary embodiment, the network request reason field in the NM message may comprise information about the NM ID of the controller targeted for a request to unsubscribe from the PNC. That is, the network request reason field may comprise the NM ID information about the second controller.

In addition, among the bits constituting the PNI field in the NM message, the bits indicating the operation in the IGN OFF state may be set to a value of "1", and other bits may be set to a value of "0".

According to an exemplary embodiment, after transmitting the NM messages in steps S610 to S680, the first controller 630 and the CCU 610 do not receive a response signal about whether the NM messages are normally received. Therefore, the first controller 630 and the CCU 610 may repeatedly transmit the same message several times to ensure safe transmission of the NM messages. For example, the first controller and the CCU may be configured to transmit the same message to the CCU or the second controller three times in each step.

In addition, according to the present embodiment, the first controller 630 is described as transmitting the first to third NM messages to other controllers through the CCU, but the first controller 630 may directly transmit the NM messages to other controllers present in the same channel without going through the CCU.

According to the embodiments of the present disclosure described thus far, various PN use-cases may be managed without changing the PN specification of the system.

In addition, various PN use-cases that are likely to be explored may be easily managed.

What is claimed is:

1. A method of transceiving performed in a network, the method comprising:
   transmitting, by a first controller, a first network management (NM) message, wherein the first NM message comprises a request for a subscription to a specific partial network cluster (PNC) to one or more second controllers;
   performing, by each of the one or more second controllers, an operation setting for the specific PNC in response to the first NM message;
   broadcasting, by the first controller, a second NM message, wherein the second NM message comprises a request that an identifier of the specific PNC be set to the network; and
   maintaining, by the one or more second controllers, a wake-up state, regardless of a preset sleep condition, upon receiving the second NM message.

2. The method of claim 1, further comprising transmitting, by the first controller, a third NM message,
   wherein the third NM message comprises a request for a cancellation of the subscription to the specific PNC to each of the one or more second controllers.

3. The method of claim 2, wherein:
   the first and third NM messages comprise a network request reason field, and
   the network request reason field comprises an NM identifier (NM ID) for each of the one or more second controllers.

4. The method of claim 2, wherein:
   the first NM message, the second NM message, and the third NM message comprise a control bit vector field, and
   the control bit vector field comprises:
      an indicator for a request for a PNC subscription; and
      an indicator for a request for a cancellation of a PNC subscription.

5. The method of claim 2, wherein:
   the first NM Message, the second NM message, and the third NM message comprise a partial network information (PNI) field, and
   the PNI field comprises information about an operation of the one or more second controllers.

6. The method of claim 1, wherein:
   the second NM message comprises a network request reason field, and
   the network request reason field comprises a value of "0".

7. The method of claim 1, wherein the network is a vehicle network.

8. A network system comprising:
   a first controller configured to:
      transmit a first network management (NM) message comprise a request for a subscription to a partial network cluster (PNC) to one or more second controllers; and
      broadcast a second NM message comprising a request that an identifier of the specific PNC be set to a network; and
   the one or more second controllers configured to maintain a wake-up state, regardless of a preset sleep condition, upon receiving the second NM message from the first controller.

9. The system of claim 8, wherein;
   the first controller is configured to transmit a third NM message, and
   the third NM message comprises a request for a cancellation of the specific PNC to each of the one or more second controllers.

10. The system of claim 9, wherein:
    the first NM message and the third NM message comprise a network request reason field, and
    the network request reason field comprises an NM identifier (NM ID) for each of the one or more second controllers.

11. The system of claim 9, wherein:
    the first NM message, the second NM message, and the third NM message comprise a control bit vector field, and
    the control bit vector field comprises:
       an identifier for the request for the subscription to the specific PNC; and
       an identifier for the request for the cancellation of the specific PNC.

12. The system of claim 9, wherein:
    the first NM message, the second NM message, and the third NM message comprise a partial network information (PNI) field, and
    the PNI field comprises information about an operation of the one or more second controllers.

13. The system of claim 8, wherein:
    the second NM message comprises a network request reason field, and
    the network request reason field comprises a value of "0".

14. The system of claim 8, wherein the network is a vehicle network.

* * * * *